United States Patent
Lai

(10) Patent No.: US 7,542,010 B2
(45) Date of Patent: Jun. 2, 2009

(54) PREVENTING IMAGE TEARING WHERE A SINGLE VIDEO INPUT IS STREAMED TO TWO INDEPENDENT DISPLAY DEVICES

(75) Inventor: Jimmy Kwok Lap Lai, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 752 days.

(21) Appl. No.: 11/191,454

(22) Filed: Jul. 28, 2005

(65) Prior Publication Data

US 2007/0024524 A1 Feb. 1, 2007

(51) Int. Cl.
*G09G 5/00* (2006.01)
(52) U.S. Cl. ................. 345/1.1; 345/1.2; 345/1.3; 345/213; 345/539
(58) Field of Classification Search ........... 345/1.1–1.3, 345/213, 539
See application file for complete search history.

(56) References Cited

U.S. PATENT DOCUMENTS

| | | | |
|---|---|---|---|
| 6,100,906 A | 8/2000 | Asaro et al. | |
| 6,215,459 B1 | 4/2001 | Reddy et al. | |
| 6,307,565 B1 | 10/2001 | Quirk et al. | |
| 6,445,878 B1 * | 9/2002 | Kato et al. | 386/96 |
| 6,489,953 B1 * | 12/2002 | Chen | 345/213 |
| 6,654,021 B2 * | 11/2003 | Wasserman et al. | 345/535 |
| 6,885,377 B2 | 4/2005 | Lim et al. | |
| 2003/0169259 A1 | 9/2003 | Lavelle et al. | |
| 2004/0179019 A1 * | 9/2004 | Sabella et al. | 345/537 |

* cited by examiner

*Primary Examiner*—Richard Hjerpe
*Assistant Examiner*—Leonid Shapiro

(57) ABSTRACT

The invention is generally directed to methods and apparatus for preventing image tearing where a single video input is streamed to two or more independent display devices for simultaneous display. A preferred method includes: (a) receiving a sequence of frames from an image data source for refreshing a first display device and at least a second display device; (b) storing a first, sequential frame in the sequence in a first buffer; (c) storing a second, sequential frame in the sequence in a second buffer; (d) refreshing the first display device from the first buffer; (e) refreshing the second display device from the first buffer; (f) determining whether the steps (d) and (e) of refreshing the first and second display devices are complete; and (g) storing a third, sequential frame in the sequence in the first buffer, provided the steps (d) and (e) of refreshing are complete.

19 Claims, 2 Drawing Sheets

PREVENTING IMAGE TEARING WHERE A SINGLE VIDEO INPUT IS STREAMED TO TWO INDEPENDENT DISPLAY DEVICES

FIELD OF INVENTION

The present invention relates to graphics display systems. In particular, preferred embodiments relate to methods and apparatus for preventing image tearing where a single video input is streamed to two or more independent display devices for simultaneous display.

BACKGROUND

The images rendered by display devices in graphics display systems consist of a matrix of closely spaced dots ("pixels"). Numeric values (also referred to as pixels) define the color and brightness of each of the pixels. Each of the pixels in the display device must be refreshed with its numeric data value many times per second, e.g., 60 Hz. Refresh cycles are necessary because the light emitted from the pixels typically decays with time and because the image being rendered generally changes with time, which requires that the pixels be provided with new values. Generally, the pixels are refreshed in a raster scan pattern, that is, the display screen is scanned from side-to-side in rows from top-to-bottom. A matrix of pixels for refreshing the display screen is referred to as a "frame." Generally, the matrix is raster-ordered.

More than one "window" may be simultaneously rendered on a display screen. The largest window, which may fill the entire display area, is generally referred to as a "main-window." A window that is smaller than the entire display screen, and which overlays the "main-window" is referred to as a "sub-window." A "sprite" is a small number of pixels that define, for example, a screen cursor. The sprite also overlays the main-window.

A camera generates frames. Camera frames may be rendered in the main-window or in a sub-window. Often, camera frames do not have the same dimensions as either the main- or sub-window. Accordingly, before refreshing the display screen with a camera frame, it is often necessary to crop or scale the camera frame The pixel data for a frame is typically stored in a memory. Generally, the image is stored in raster order. When the screen is refreshed, the frame is fetched from the memory and transmitted to the display device. This memory is known as a refresh, display, or frame buffer. The frame buffer may be a dedicated memory or a dedicated portion of a memory.

The image data for defining an image is stored in the frame buffer by an image data source or input, such as a CPU, digital signal processor ("DSP"), or a digital camera. The data source may store a single frame for the display of a static image, such as photograph, or it may repeatedly store frames in a sequence for rendering video.

"Image tearing" is an artifact that may appear on the display screen, particularly when rendering video. In a refresh cycle, the entire display frame (which includes main-and sub-windows) is fetched from the frame buffer in raster order and transmitted to the display device. It is generally assumed that the image data stored in the frame buffer is static during the refresh cycle. That is, in a refresh cycle pixels are transferred to the display panel as if it were a single frame. Image tearing occurs when the pixels transmitted to the display panel are not all from the same frame.

If the data source is writing pixels to the frame buffer at the same time that pixels are being fetched from the frame buffer, image tearing can occur. There are at least three cases: First, image tearing may be caused because the writing of a new frame catches up with and overtakes the fetching of the current frame. Second, image tearing may occur because the fetching of a current frame catches up with and overtakes the writing of a new frame. Third, image tearing may occur if the frame is rotated for display. For example, suppose that the frame is stored with a 90 degree rotation. As raster-order pixels are received from the input, the pixels of a given row if the image will be written to all of the rows of the frame buffer. The fetching of the rotated frame for display is in raster order. If at the same time that the frame is being written vertically, it is also being fetched for display horizontally, image tearing will occur. (The same result will occur if the image is stored in raster order, but fetched vertically for rotation of the displayed image.) In these cases, the image data presented to the display device during the refresh cycle comes from two distinct frames, rather than a single frame.

One technique known in the art for preventing image tearing is "double-buffering." In a double-buffer system, the input device writes a frame to a buffer 1 while the output device reads a frame from a buffer 2. Similarly, while the output device reads from the buffer 1, the input device writes to the buffer 2.

Portable, battery-powered devices, such as mobile telephones, personal digital assistants, and digital music devices are increasingly being provided with two or more display panels. These graphics display systems are capable of rendering the same video image simultaneously on each of the display panels. That is, image data from a single image data input may be streamed to the all of the panels for simultaneous display. Thus, image tearing is possible on one or more of the panels.

The known double-buffering technique for preventing image tearing, however, is only adapted for a single output device. Known techniques do not provide for efficiently preventing image tearing where a single video input is streamed to two or more independent display devices for simultaneous display. Duplicating the known double-buffering technique for more than one independent output device would dictate a pair of buffers for each output device. However, this would increase the size of memory required and, accordingly, the cost and power requirements of the graphics display system. Moreover, the use of a pair of buffers for each output device would necessitate writing each input frame to memory two (or more) times, increasing memory bandwidth requirements and power consumption.

Accordingly, methods and apparatus for preventing image tearing where a single video input is streamed to two or more independent display devices for simultaneous display is desirable.

SUMMARY

The invention is generally directed to methods and apparatus for preventing image tearing where a single video input is streamed to two or more independent display devices for simultaneous display. A preferred method includes: (a) receiving a sequence of frames from an image data source for refreshing a first display device and at least a second display device; (b) storing a first, sequential frame in the sequence in a first buffer; (c) storing a second, sequential frame in the sequence in a second buffer; (d) refreshing the first display device from the first buffer; (e) refreshing the second display device from the first buffer; (f) determining whether the steps (d) and (e) of refreshing the first and second display devices are complete; and (g) storing a third, sequential frame in the sequence in the first buffer, provided the steps (d) and (e) of refreshing are complete.

A preferred graphics controller for preventing image tearing where a single video input is streamed to two or more independent display devices for simultaneous display includes: (a) an input interface unit for receiving a sequence of frames from a data source for refreshing a first output device and a second output device; (b) a first buffer for storing a first, sequential frame in the sequence; (c) a second buffer for storing a second, sequential frame in the sequence; (e) a first output interface for refreshing the first output device from the first buffer; (e) a second output interface for refreshing the second output device from the first buffer; (f) a write control unit for permitting the input interface unit to store a third, sequential frame in the sequence in the first buffer, provided the refreshing of the first and second display devices are complete.

A preferred graphics display system comprises: a host; a first output device and at least a second output device; a data source, a memory, and a graphics controller. The data source provides a sequence of frames of data for simultaneous rendering on the first output device and the second output devices. The memory includes a first buffer for storing a first, sequential frame in the sequence, and a second buffer for storing a second, sequential frame in the sequence. The graphics controller includes: (a) an input interface unit for receiving the sequence of frames; (b) a first output interface for refreshing the first output device from the first buffer; (c) a second output interface for refreshing the second output device from the first buffer; and (d) a write control unit for permitting the input interface unit to store a third, sequential frame in the sequence in the first buffer, provided the refreshing of the first and second display devices are complete.

In one preferred embodiment, a program of instructions is stored in a machine readable medium. The program of instructions are executable by a processing device for performing a method according to the invention. Preferably, the method includes: (a) receiving a sequence of frames from an image data source for refreshing a first display device and at least a second display device; (b) storing a first, sequential frame in the sequence in a first buffer; (c) storing a second, sequential frame in the sequence in a second buffer; (d) refreshing the first display device from the first buffer; (e) refreshing the second display device from the first buffer; (f) determining whether the steps (d) and (e) of refreshing the first and second display devices are complete; and (g) storing a third, sequential frame in the sequence in the first buffer, provided the steps (d) and (e) of refreshing are complete.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION

Figure 1:
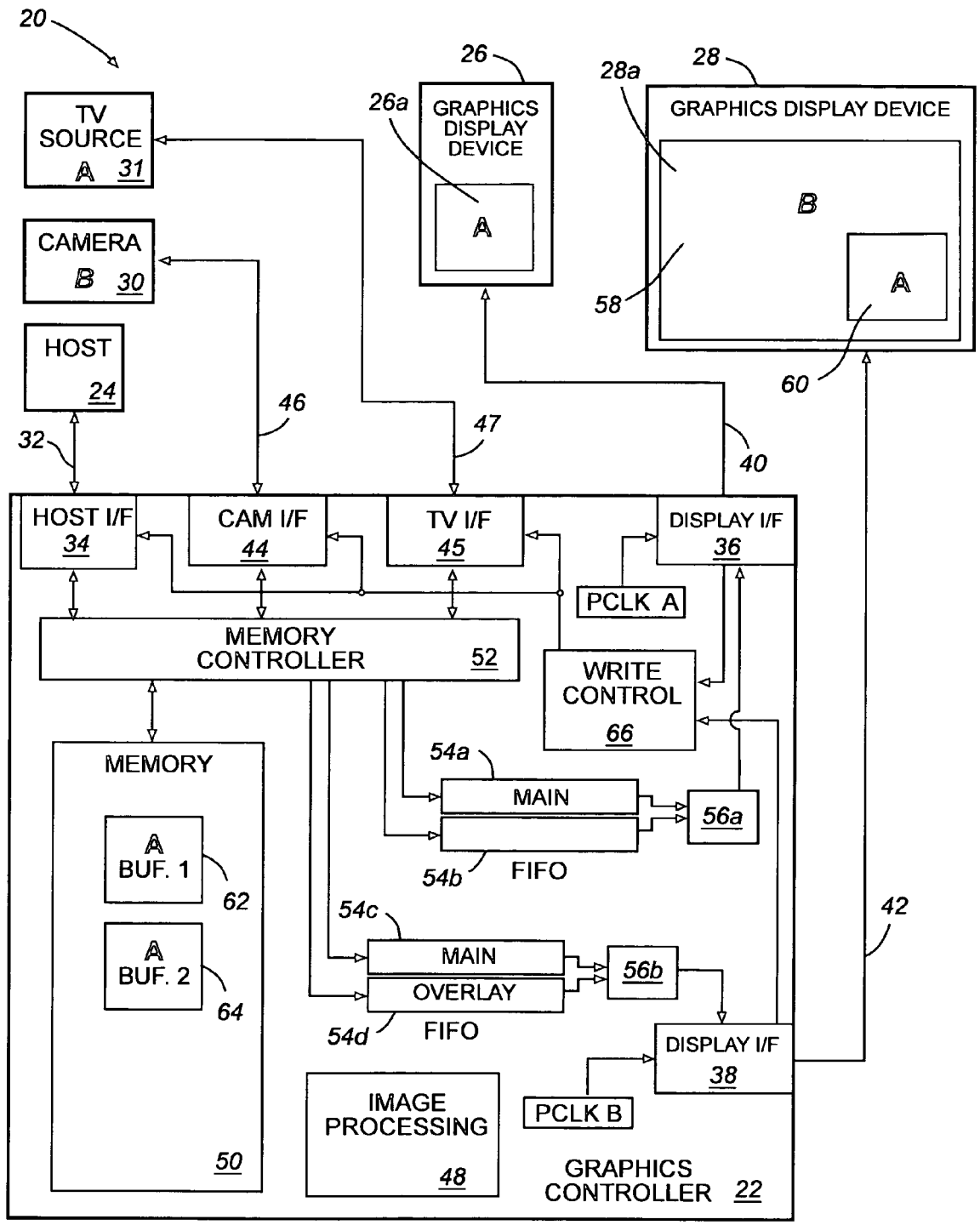
FIG. 1 is a block diagram of an exemplary graphics display system having two independent display devices for simultaneous display of a single video input and a graphics controller for preventing image tearing according to a preferred embodiment of the present invention.

Reference will now be made in detail to specific preferred embodiments of the invention, examples of which are illustrated in the accompanying drawings. Wherever possible, the same reference numbers are used in the drawings and the description to refer to the same or like parts.

FIG. 1 shows a graphics display system 20 which illustrates a preferred context for the invention. The graphics display system 20 includes a graphics controller 22 according to one preferred embodiment of the present invention. The system 20 may be any digital system or appliance. Where the system 20 is a portable digital appliance, it is typically powered by a battery (not shown). The system 20 typically includes a host 24, a first graphics display device 26, a second graphics display device 28, and one or more image data sources, such as a camera module ("camera") 30 and a TV source 31. The graphics controller 22 interfaces the host and the image data sources with the display devices.

The host 24 is typically a microprocessor, but may be a DSP, a computer, or any other type of controlling device adapted for controlling digital circuits. The host 24 communicates with the graphics controller 22 over a bus 32 to a host interface 34 in the graphics controller.

The graphics controller 22 includes display device interfaces 36, 38 for interfacing between the graphics controller and the display devices 26, 28 over display device buses 40, 42. LCDs are typically used as display devices in portable digital appliance, such as mobile telephones, but any device (s) capable of rendering pixel data in visually perceivable form may be employed. The first display device 26 has a display area 26a. The second display device 28 has a display area 28a. The display devices are adapted for displaying pixel data on their display areas. In other embodiments, display devices 26, 28 may include more than one display area. Further, in an alternative embodiment, the display devices are adapted for rendering other types of data, such as rendering audio data by making it audible.

The graphics controller 22 is preferably used in graphics display systems comprising at least two image data sources, such as a host, a camera, or a TV source, and at least two graphics display devices. In an alternative embodiment, the data sources provide other types of data, e.g., audio data. Preferably, the graphics controller is a separate IC from the remaining elements of the system, that is, the graphics controller is "remote" from the host, camera, and display devices. Preferred graphics controllers may or may not be remote from a frame buffer memory.

The pixel data correspond to image frames. A frame generally corresponds to a single image viewed on a display device. The pixel data are typically streamed from an image data source in raster order. The pixel data of a particular row are grouped together so that all of the pixel data corresponding to a particular row are streamed before any pixel data corresponding to a subsequent row are streamed. Likewise, the pixel data of particular frames are grouped together so that all of the pixel data corresponding to a particular frame are streamed before any pixel data corresponding to a subsequent frame are streamed. Accordingly, rows and frames are received from a particular image data source by the graphics controller 22 in a sequential order.

The graphics controller 22 includes a camera interface 44 ("CAM I/F") for receiving pixel data output on data lines of a bus 46 from the camera 30 along with vertical and horizontal synchronizing signals. A camera clocking signal is provided to the camera by the graphics controller for clocking the pixel data out of the camera.

The graphics controller 22 also includes a TV interface 45 ("TV I/F") for receiving pixel data output on data lines of a bus 47 from the TV source 31 along with vertical and horizontal synchronizing signals. While the exemplary system 20 includes a TV source 31 and a TV interface 45 in order to illustrate a preferred context, it is not essential that the TV source 31 provide image data from a television camera. In alternative embodiment, the TV source 31 and a TV interface 45 may be, respectively, a second camera (of any type) and a second camera interface. Further, in another alternative embodiment, the TV source 31 and a TV interface 45 may be omitted from the system 20.

A number of image processing operations may be performed on data provided by an image data source. Such image processing operations are performed by units included in an image processing block indicated generally as 48 in FIG. 1. The image processing block 48 may include, for example, a CODEC for compressing and decompressing image data, a resizer for scaling and cropping the data, and a color converter for converting the color format of the data. Image processing operations, such as cropping, scaling, compression encoding, and color converting, may be performed as the data are received, "on the fly," or they may be performed on data that have been stored in a memory.

In a preferred embodiment, the graphics controller includes an memory 50 for storing frames of image data. In other embodiments, however, the memory 50 may be remote from the graphics controller. Data are stored in and fetched from the memory 50 under control of a memory controller 52. The memory 50 is preferably an SDRAM, however, any type of memory may be employed.

Typically, the image data stored in the memory 50 are fetched and transmitted through a plurality of parallel "display pipes" 54 (e.g., 54a, 54b, 54c, 54d), which are preferably FIFO buffers. The output of the display pipes 54 are passed through respective selecting units 56a, 56b for selecting data from one of the pipes 54. Image data for display on graphics display device 26 is transmitted from the selecting unit 56a through the display device interface 36 and output bus 40 to the display device. Image data for display on graphics display device 28 is transmitted from the selecting unit 56b through the display device interface 38 and output bus 42 to the display device.

The display pipes 54 may be employed for buffering a main-image, one or more overlay-images, and a sprite image. As one example with reference to display area 28a, the display pipe 54c may be used for buffering a main image 58 while the display pipe 54d is used for buffering an overlay image 60. Both the main and overlay images 58, 60 are rendered on the display area 28a of the second display device 28. As mentioned, pixels are generally written to the display in raster order. When pixels are to be written to the rectangular area defining the overlay window, the selecting unit 56b fetches pixels from the overlay display pipe 54d. When pixels are to be written outside the rectangular area defining the overlay window, the selecting unit 56b fetches pixels from the main window display pipe 54c.

Continuing the example, frames of image data from the TV source 31 are rendered on the display device 26 as a main image "A", and image data from the camera 30 are rendered as a main image "B" (58) on the display device 28, In addition, frames of image data from the TV source 31 are also rendered on the display device 26 as an overlay image "A" (60). The image data from the TV source 31 may cropped or scaled in order to fit within the sub-window on the display screen 28a, but this is not essential.

In the exemplary system 20, the display pipes 54a, 54b are employed for use with the display area 26a, the display pipes 54a, 54b (and additional instances) may be used for buffering a main image, an overlay image, and a sprite image.

Preferably, the display devices 26, 28 are "independent" display devices. With respect to the at least two independent display devices in the system 20, one or more relevant parameters pertaining to refresh cycles are not matched. Exemplary relevant parameters include but are not limited to display resolution, refresh rate, pixel clock rate, color depth, and panel type (e.g., TFT, DSTN, RAM based, and non-RAM based). As one example, the display device 26 has a resolution of 320×240 while the display device 28 has a resolution of 640×480. As another example, the display device 26 has a refresh rate of 50 Hz while the display device 28 has a has a refresh rate of 60 Hz. The display device 26 is preferably clocked by a first pixel clock, "PCLK A" and display device 28 is preferably clocked by a second pixel clock, "PCLK B," where PCLKs A and B have different frequencies. As will be appreciated by one skilled in the art, many other examples of display devices independent requirements may be provided.

In order to prevent image tearing, a pair of buffers "BUF. 1" and "BUF. 2" 62, 64 are preferably provided in the memory 50 for storing frames of image data from the source 31. In data path terms, in one preferred embodiment, the source 31 writes to buffer 1 (62) and buffer 2 (64) via the interface 45 and memory controller 52. The display I/F 36 reads from buffers 1 and 2, (62, 64) via the memory controller 52, the main display pipe 54a, and the selecting circuit 56a. In addition, the display I/F 38 reads from buffers 1 and 2, (62, 64) via the memory controller 52, the overlay display pipe 54d, and the selecting circuit 56b.

In operation, while the source 31 writes to buffer 1 (62), both the display I/F 36 and display I/F 38 read from buffer 2 (64). When the source 31 tries to write the next frame, it has to wait until both display I/F 36, 38 have finished reading from buffer 2. Because the display devices 26, 28 are independent display devices, the display I/F 36 and the display I/F 38 typically require different amounts of time for reading from buffer 2 (64) and finish reading from buffer 2 at different points in time.

According to a preferred embodiment, a TE signal is asserted when the input source 31 has finished writing one of the frame buffers, for example, buffer 1. Once asserted, the TE signal will not be de-asserted until after both display I/Fs 36, 38 have finished reading from the other buffer, i.e., buffer 2. Preferably, signals indicative of respective vertical non-display periods of the display devices 26, 28 are used for determining when the display I/Fs 36, 38 have finished reading from the other buffer 64. Similarly, a signal indicative of vertical non-display period of the TV source 31 may be used are used for determining when the input has finished writing a frame. The TE signal may be generated by a write control unit 66 for internal use as described below. Alternatively, the TE signal may be asserted and de-asserted by logic (not shown) external to the write control unit 66.

When the input source 31 has finished writing a frame and wants to write the next frame, the write control unit 66 checks the TE signal. If the write control unit 66 "sees" that the TE signal is asserted, it means that either or both display I/Fs 36, 38 are still reading from the other buffer 64. Accordingly, the write control unit 66 prevents the input source 31 from writing to the other buffer 64. In other words, assertion of the TE signal prevents the input source 31 from writing to the another buffer when it is in use for refreshing on of the plurality of independent display devices. When the TE signal is de-asserted, it means that both display I/Fs 36, 38 have finished reading from the other buffer and have started or will soon start reading from the buffer that was just updated by the input source 31, i.e., buffer 62. When the TE signal is de-asserted, it means that the input source 31 can start writing the next frame to the other buffer 64. Accordingly, the write control unit 66 allows the input source 31 to begin writing to the other buffer. This method and apparatus prevents any part of the output image being read by both of the display I/Fs 36, 38 from being overwritten by the next incoming image, which would cause image tearing.

The write control unit 66 (or a logic unit external to the unit 66) preferably includes hardware logic for asserting and de-asserting the TE signal according to the invention. Alternatively, the write control unit 66 may include software for implementing a preferred method according to the invention and logic executing the software. In one preferred embodiment, a program of instructions is stored in a machine readable medium, such as the memory 50 or another memory remote from the graphics controller, e.g., a flash memory unit. In these embodiments, the program of instructions are executable in a processing device included in the graphics controller, such as the write control unit 66.

Figure 2:
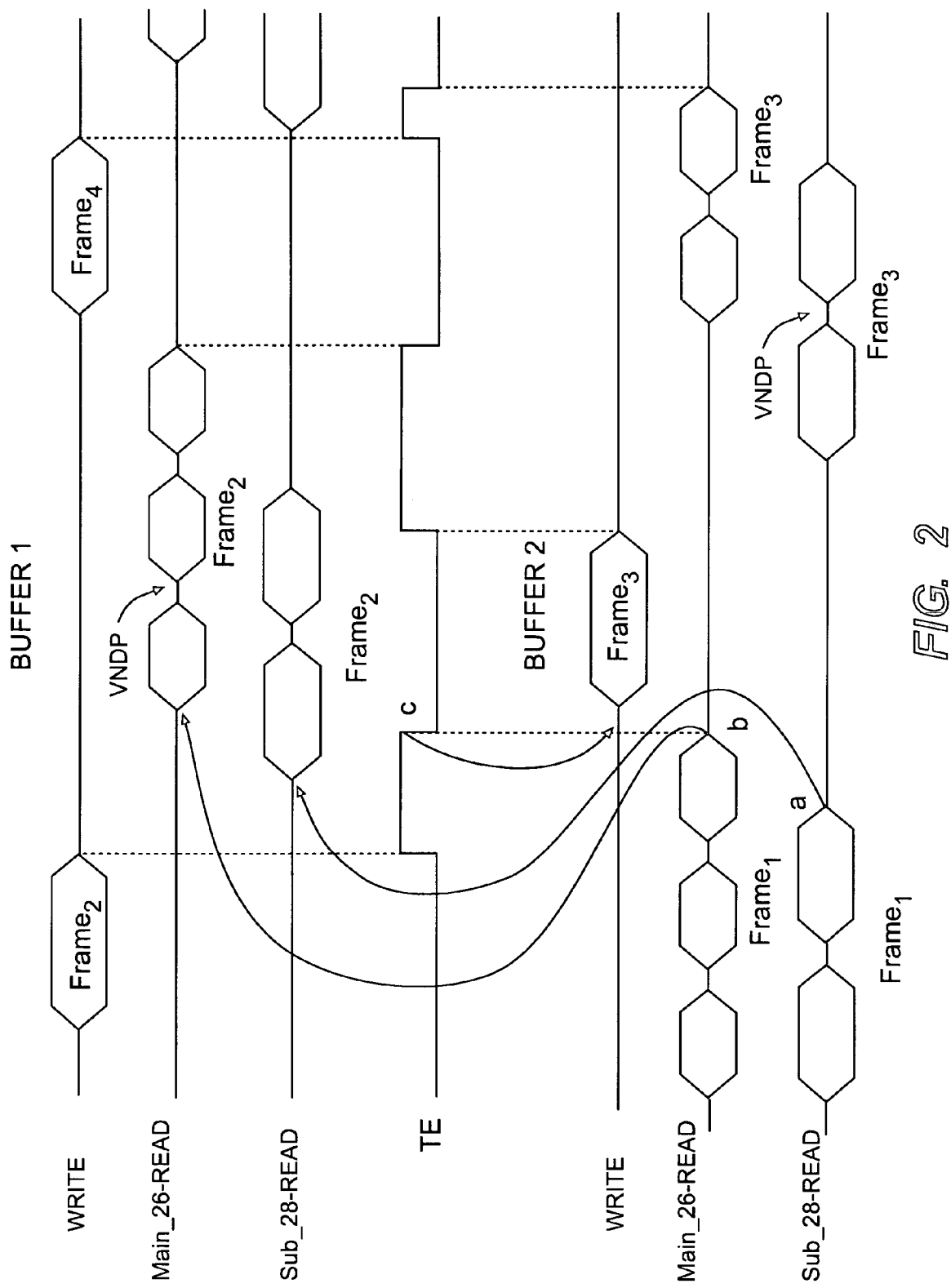
FIG. 2 is a timing diagram for the graphics display system of FIG. 1.

Referring to FIG. 2, a timing diagram for the exemplary graphics display system 20 is shown. The top three lines of FIG. 2 represent transfers to and from buffer 1, and the bottom three lines refer to transfers to and from buffer 2. The line in the middle of FIG. 2 is the signal TE.

Examining FIG. 2 from left to right, it can be seen on the top line that a Frame$_2$ is written to buffer 1 by the input source. At the same time, the bottom two lines show that a Frame$_1$, is being fetched from Buffer 2. One of the display interfaces, e.g., display I/F 36, fetches Frame$_1$ for writing to display device 26 (Main_26-Read) and the other display interface, e.g., display I/F 38, fetches Frame$_1$ for writing to the display device 28 (Sub_38-Read). Between each fetch from memory, the respective vertical non-display periods of display devices are shown ("VNDP"). It can also be seen that the display devices have different frame rates, with roughly 2½ frames written to display 26 in the time that two frames are written to display 28.

When the writing to buffer 1 of Frame$_2$ is finished, the TE signal goes high. When the reading of Frame$_1$ from buffer 2 for display 28 is complete, the display I/F 38 for interfacing to display 28 recognizes that TE is high and switches to fetching Frame$_2$ from buffer 1, as indicated by arrow "a." If, at this time, image input source were also to switch to writing a next sequential frame, e.g., a Frame$_3$ to buffer 2, image tearing could result on display 26. The reason is that the third fetch of Frame$_1$ from buffer 2 is still in progress at this point. Only when the reading of Frame$_1$, from buffer 2 for display 26 is complete does the display I/F 36 for display 26 switch to fetching Frame$_2$ from buffer 1, as indicated by arrow "b." In addition, when the later of the two fetching processes finishes, in this case the fetching for display 26, the TE signal goes low ("c"). The transition of TE to low causes the image input logic to switch to writing Frame$_3$ to buffer 2.

In a preferred embodiment, the input data source has the capability of controlling when it begins storing a particular frame in a sequence of frames. This permits the input to source to delay beginning of writing a frame until the later of a plurality fetching processes finishes. Generally, image data is fetched for the output devices at a slower rate than input source writes data, but it is generally not possible to pause the writing of data to the output devices.

It can be seen from the foregoing, that methods and apparatus according to the invention preventing image tearing where a single video input is streamed to two or more independent display devices for simultaneous display. The methods and apparatus efficiently preventing image tearing without requiring a pair of buffers for each output device, and without requiring each input frame be written to memory two (or more) times. Accordingly, the present invention reduces the size of memory and memory bandwidth that would otherwise be required thereby saving cost and conserving power.

While preferred contexts for the invention involve a single input source streaming video data for simultaneous display on two or more display devices, the principles of the invention may be employed in the context of a single input source streaming audio data for simultaneous display on two or more audio playing (or storing) devices. In this alternative context, the artifact to be prevented is an audible artifact analogous to image tearing. Further, in this alternative context, the "frames" of image data, are discrete packets of audio data output by the audio input source.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for preventing image tearing where a single input is streamed to two or more independent display devices for simultaneous display, comprising:
    (a) receiving a sequence of frames from a data source at a first rate for refreshing a first display device and at least a second display device;
    (b) storing a first, sequential frame in the sequence in a first buffer;
    (c) storing a second, sequential frame in the sequence in a second buffer;
    (d) refreshing the first display device, the refreshing of the first display device including reading the first frame from the first buffer after the step (b) of storing is complete and reading the second frame from the second buffer after the step (c) of storing is complete, wherein, if after reading the first frame the step (c) of storing is not complete, the refreshing of the first display device includes re-reading the entire first frame from the first buffer before reading the second frame;
    (e) refreshing the at least a second display device, the refreshing of the at least a second display device including reading the first frame from the first buffer after the step (b) of storing is complete and reading the second frame from the second buffer after the step (c) of storing is complete, wherein, if after reading the first frame the step (c) of storing is not complete, the refreshing of the at least a second display device includes re-reading the entire first frame from the first buffer before reading the second frame;
    (f) determining whether the steps (d) and (e) of refreshing the first and second display devices are complete; and
    (g) storing a third, sequential frame in the sequence in the first buffer, provided the steps (d) and (e) of refreshing are complete.

2. The method of claim 1, wherein the first display device and the at least a second display device have different refresh rates.

3. The method of claim 1, wherein the first display device and the at least a second display device have different output resolutions.

4. The method of claim 1, wherein at least one of the first display device and the at least a second display device is a liquid crystal display device.

5. The method of claim 1, wherein:
the reading of the second frame from the second buffer after the step (c) of storing is complete, which is included in the refreshing of the first display device, begins at a first time;
the reading of the second frame from the second buffer after the step (c) of storing is complete, which is included in the refreshing of the at least a second display device, begins at a second time; and
the first time and the second time are different.

6. A graphics controller, comprising:
(a) an input interface unit to receive a sequence of frames at a first rate from a data source for refreshing a first output device and at least a second output device;
(b) a first buffer to store a first, sequential frame in the sequence;
(c) a second buffer to store a second, sequential frame in the sequence;
(d) a first output interface to refresh the first output device at a first refresh rate, the first output interface to cause a selected one of the first and second buffers to be read, the first output interface selecting the first buffer for reading after the storing of the first frame is complete and selecting the second buffer for reading after the storing of the second frame is complete, wherein, if after reading the entire first frame the storing of the second frame is not complete, the first output interface causes the entire first frame to be re-read from the first buffer before the selecting of the second buffer for reading;
(e) a second output interface to refresh the at least a second output device at second refresh rate, the second output interface to cause a selected one of the first and second buffers to be read, the second output interface selecting the first buffer for reading after the storing of the first frame is complete and selecting the second buffer for reading after the storing of the second frame is complete, wherein, if after reading the entire first frame the storing of the second frame is not complete, the second output interface causes the entire first frame to be re-read from the first buffer before the selecting of the second buffer for reading;
(f) a write control unit to permit a third, sequential frame in the sequence to be stored in the first buffer, provided the refreshing of the first and second display devices are complete.

7. The graphics controller of claim 6, wherein the first refresh rate and the second refresh rate are different refresh rates.

8. The graphics controller of claim 7, wherein the first rate is independent of the first refresh rate and the second refresh rate.

9. The graphics controller of claim 6, wherein the first output device and the second output device have different output resolutions.

10. The graphics controller of claim 9, wherein the first refresh rate and the second refresh rate are equal.

11. The graphics controller of claim 6, wherein the data is audio data.

12. The method of claim 2, wherein the first rate is independent of the respective refresh rates of the first display device and the at least a second display device.

13. The method of claim 6, wherein:
the first output interface selects the second buffer for reading at a first time;
the second output interface selects the second buffer for reading at a second time; and
the first and second times are different.

14. A graphics display system, comprising:
a host;
a first output device and at least a second output device;
a data source to provide a sequence of frames of data at a first rate for simultaneous rendering on the first output device and the at least a second output device;
a memory having a first buffer to store a first, sequential frame in the sequence, and a second buffer to store a second, sequential frame in the sequence; and
a graphics controller, including:
(a) an input interface unit to receive and store the sequence of frames in the memory;
(b) a first output interface to refresh the first output device from the first buffer, the first output interface to cause a selected one of the first and second buffers to be read, the first output interface selecting the first buffer for reading after the storing of the first frame is complete and selecting the second buffer for reading after the storing of the second frame is complete, wherein, if after reading the entire first frame the storing of the second frame is not complete, the first output interface causes the entire first frame to be re-read from the first buffer before selecting the second buffer for reading;
(c) a second output interface to refresh the at least a second output device from the first buffer, the second output interface to cause a selected one of the first and second buffers to be read, the second output interface selecting the first buffer for reading after the storing of the first frame is complete and selecting the second buffer for reading after the storing of the second frame is complete, wherein, if after reading the entire first frame the storing of the second frame is not complete, the second output interface causes the entire first frame to be re-read from the first buffer before selecting the second buffer for reading; and
(d) a write control unit to permit the input interface unit to store a third, sequential frame in the sequence in the first buffer, provided the refreshing of the first and second display devices are complete.

15. The graphics display system of claim 14, wherein the first output device and the at least a second output device have different refresh rates.

16. The graphics display system of claim 15, wherein the first rate is independent of the respective refresh rates of the first and the at least a second output device.

17. The graphics display system of claim 14, wherein the first output device and the second output device have different output resolutions.

18. The graphics display system of claim 14, wherein the data is audio data.

19. The graphics controller of claim 14, wherein the data is image data.

* * * * *